United States Patent [19]

Nemoto

[11] Patent Number: 4,518,328
[45] Date of Patent: May 21, 1985

[54] PISTON FOR PISTON PUMP

[75] Inventor: Kiyoshi Nemoto, Chiba, Japan

[73] Assignee: Kabushiki Kaisha Murayama Seisakusho, Tokyo, Japan

[21] Appl. No.: 508,539

[22] Filed: Jul. 11, 1983

Related U.S. Application Data

[63] Continuation of Ser. No. 173,705, Jul. 30, 1980, abandoned.

[30] Foreign Application Priority Data

Mar. 14, 1980 [JP] Japan ............................. 55-32496[U]

[51] Int. Cl.³ .................. F04B 7/00; F04B 21/04
[52] U.S. Cl. ................................................. 417/511
[58] Field of Search ............................. 417/511, 513

[56] References Cited

U.S. PATENT DOCUMENTS 2,674,956  4/1954  Hilton ........................ 417/555 A
3,085,515  4/1963  Workmann ................... 417/511
3,318,256  5/1967  Green ........................ 417/511

FOREIGN PATENT DOCUMENTS 2628985 12/1977 Fed. Rep. of Germany ...... 417/511
2717297 10/1978 Fed. Rep. of Germany ...... 417/511

Primary Examiner—William L. Freeh
Attorney, Agent, or Firm—Toren, McGeady, Stanger

[57] ABSTRACT

In a piston for a piston pump including a stopper and a flange fittedly mounted on one end of the piston rod effecting a reciprocating strokes within a cylinder, a reinforcing ring member is fitted between a suction side of a piston packing and a piston member, so that the piston packing can not be forced out when a high pressure is exerted thereon. Also, friction of the piston member relative to the cylinder, which would lead to wear of such members, can be avoided, and in the event that the packing is worn, the airtightness between the piston member and the cylinder can be maintained by the reinforcing ring.

1 Claim, 4 Drawing Figures

PISTON FOR PISTON PUMP

This is a continuation of application Ser. No. 173,705, filed July 30, 1980, now abandoned.

BACKGROUND OF THE INVENTION

1. Field of the Invention

This invention relates to the improvements in a piston for a piston pump.

2. Description of the Prior Art

Generally speaking, a piston of a piston pump, particularly of a high pressure piston pump receives a high pressure. Due to such a high pressure, a piston packing is forced out of the piston member or easily worn out. Consequently, friction of the piston member relative to a cylinder increases, thus accelerating breakage of the piston member or the cylinder, and reducing airtightness therebetween as the packing is worn, resulting in the failure of the parallel reciprocating stokes of the piston within the cylinder.

SUMMARY OF THE INVENTION

In an attempt to eliminate the disadvantages observed in the prior art, it is an object of the present invention to provide an improved piston for a piston pump, wherein a reinforcing ring member is fitted between a suction side of a piston packing and a piston member, so that the piston packing can not be forced out when a high pressure is exerted thereon. Also, friction of the piston member relateive to the cylinder, which would lead to wear of such members, can be avoided, and in the event that the packing is worn, the airtightness between the piston member and the cylinder can be maintained by the reinforcing ring.

DESCRIPTION OF THE PREFERRED EMBODIMENTS

Figure 1:
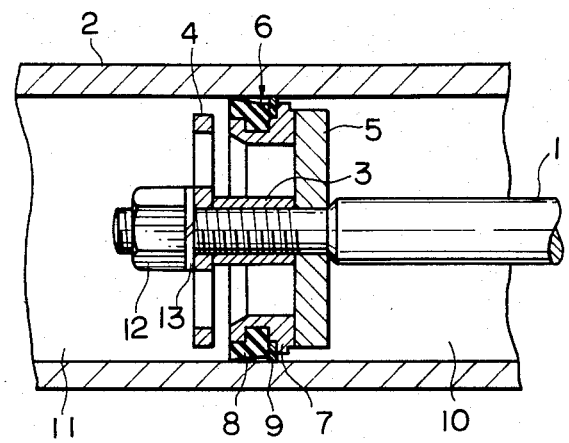
FIG. 1 is a longitudinal cross sectional view of a piston according to a first embodiment of the present invention.
Figure 2:
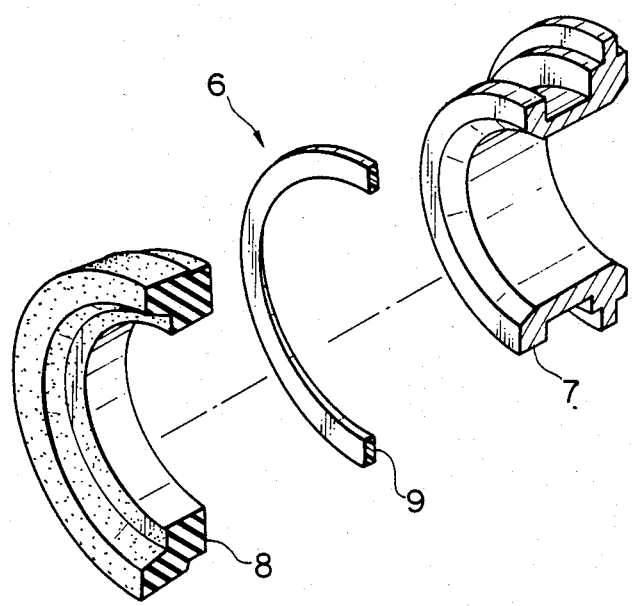
FIG. 2 is an exploded perspective view of the piston of FIG. 1.

FIG. 1 illustrates a piston according to a first embodiment of the invention, shown as incorporated in a piston pump. Shown at 1 is a piston rod which is adapted to reciprocate within a cylinder 2 by a drive source (not shown), and on an inner end portion of which a stopper piece 4 and a flange 5 are mounted at a proper spacing from and in an opposing relation to each other, with a collar 3 interposed therebetween. A piston 6 according to the present invention is fitted between the stopper piece 4 and the flange 5. The piston 6, as clearly shown in FIG. 2, comprises; a piston member 7 having an outer peripheral step or rib, a packing 8 fitted on the piston member 7 on the discharge side thereof so as to slide on the inner peripheral wall of the cylinder 2, and a reinforcing ring member 9 fitted on the suction port side of the packing 8 between the packing 8 and the piston member 7 in sliding engagement along the inner wall of the cylinder 2. The piston 6 is loosely fitted between the stopper piece 4 and the flange 5 in a manner that the piston is seated on the stopper 4 or the flange 5 as the piston rod effects the reciprocating movement within the cylinder, whereby a fluid is fed under pressure from the suction port side 10 to the discharge port side 11. The reinforcing ring member 9 is made of a wear-resisting synthetic resin, such as nylon.

Shown at 12 is a nut for fastening the stopper piece 4 and the flange 5 to the end portion of the piston rod 1, and at 13 a spring washer.

By virtue of the action of the reinforcing ring member 9 fitted between the suction port side of the packing 8 and the piston member 7, the packing 8 is no longer forced out or swelled out under a high pressure during service thereof, and hence friction between the metallic members, i.e. the piston member 7 and the cylinder 2, does not occur. In the event that the packing 8 is worn out during service for a long period of time, airtightness between the piston member and the cylinder is maintained by the reinforcing ring member 9.

Figure 3:
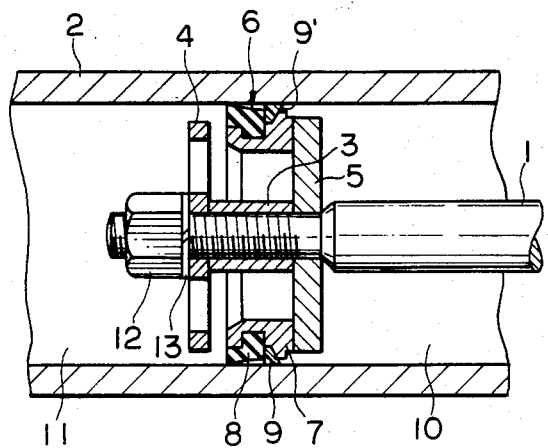
FIGS. 3 and 4 are longitudinal cross sectional views of pistons according to a second and third embodiments of the invention, respectively.

FIG. 3 illustrates a modified piston of a second embodiment, wherein an improved airtightness by the reinforcing ring member 9 is provided. In this embodiment, the inner peripheral wall of the reinforcing ring member 9 is divergent as at 9' toward the suction port side of the piston, so that the reinforcing ring member 9 will be circumferentially spread when a high pressure is exerted thereon, thereby increasing the contacting area of the ring member with the cylinder 2, thereby providing increased airtightness.

Figure 4:
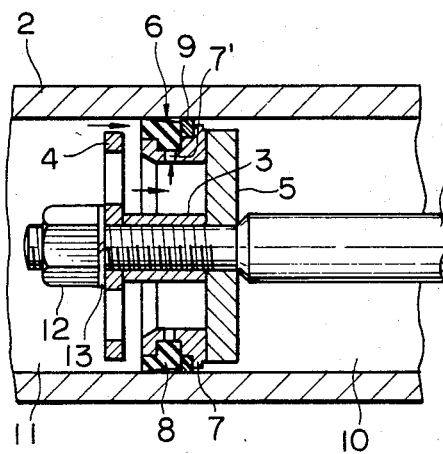

FIG. 4 shows a fourth embodiment of the invention, wherein an improved sealing ability is provided for the packing 8 itself. A pressure hole 7' is provided in the piston member 7 so as to communicate pressure between the discharge port side 11 and the inner peripheral wall of the packing 8. When a high pressure is applied, pressure on the discharge port side 11, namely, on the high-pressure side, acts as an inner pressure on the packing 8, thereby providing an improved airtightness in the circumferential direction, of the packing 8.

Except for the above-described features, the pistons of the second and third embodiments are the same in structure as the piston of the first embodiment, and hence no further description is deemed necessary. In FIGS. 3 and 4, components common to those of FIG. 1 are shown by the identical reference numerals with those of FIG. 1.

As is apparent from the foregoing, by virtue of the action of the reinforcing ring member 9, the packing has no likelihood of being pressed out even under a high pressure, and hence friction between metallic members (between the cylinder and the piston member) is avoided. In the event of the packing being worn out, the reinforcing ring member 9 acts to maintain the sealing between the piston member and the cylinder, thus enabling the piston to effect the parallel reciprocating strokes during service of the pump, without lowering the performance of the pump.

While specific embodiments of the invention have been shown and described in detail to illustrate the application of the inventive principles, it will be understood that the invention may be embodied otherwise without departing from such principles.

What is claimed is:

1. A piston assembly for a piston pump comprising cylinder means, piston rod means reciprocally movable within said cylinder means, piston means dividing the interior of said cylinder means into a fluid inlet and a fluid discharge side and having fluid flow passage means defined therethrough, a stopper member affixed to said piston rod means on the fluid discharge side of said piston means and structured to engage said piston means without impeding fluid flow through said fluid flow passage means, flange means affixed to said piston rod means on the fluid inlet side of said piston means structured to block fluid flow through said fluid flow passage means upon engagement with said piston means, said piston means being movably mounted relative to said piston rod means for movement between said stopper member and said flange means, said piston means being brought into engagement with said stopper member upon movement of said piston rod means toward said fluid inlet side and into engagement with said flange means upon movement of said piston rod means toward said fluid discharge side, said piston means operating in cooperation with said flange means to pump fluid through said cylinder means when said piston rod means is moved toward said fluid discharge side, said piston means comprising a piston member, a packing fixedly fitted on the outer periphery of said piston member in fluid-tight sliding engagement with the interior of said cylinder means, and a reinforcing ring member fitted between said packing and said piston member on the fluid inlet side of said packing, and orifice means extending through said piston means for placing the interior of said packing in flow communication with said fluid discharge side during pumping operation of said piston means to apply fluid pressure thereto urging said packing against the interior of said cylinder means, said reinforcing ring member being divergent toward the fluid inlet side of said piston means thereby presenting a divergent inner periphery.

* * * * *